United States Patent Office 3,328,369
Patented June 27, 1967

3,328,369
SOLID POLY(ISOPROPENYL ACETATE)
Frederick P. Reding, Charleston, Edgar W. Wise, South Charleston, and Edward M. Sullivan, Charleston, W. Va., assignors to Union Carbide Corporation, a corporation of New York
No Drawing. Filed Dec. 30, 1960, Ser. No. 79,573
10 Claims. (Cl. 260—89.1)

The present invention is concerned with a novel process for the free-radical catalyzed polymerization of isopropenyl acetate whereby novel, solid, high-molecular weight poly(isopropenyl acetate) products are obtained.

It has heretofore been found that isopropenyl acetate is a polymerizable monomer which ordinarily polymerizes only with difficulty, yielding liquid homopolymeric products of low molecular weight. The major difference between the polymerization of isopropenyl acetate polymerizations and polymerizations involving conventional vinyl monomers, such as vinyl acetate, for example, is attributable to the role played by chain-transfer, especially degradative chain-transfer, during the polymerization of isopropenyl acetate, particularly when free-radical polymerization catalysts are employed.

By way of illustration, is addition to conventional chain-initiation, chain-propagation and chain-termination, another type of chain-transfer reaction that can occur during the polymerization of isopropenyl acetate involves both the isopropenyl acetate monomer and a free-radical formed either from the active growing polymer chain or from the free-radical polymerization catalyst when employed, and entails the loss of a hydrogen atom to the free-radical by the isopropenyl acetate monomer. The monomer free-radical thus produced, i.e.

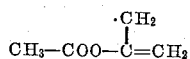

is stabilized by resonance as indicated by the equation below, which in effect also makes the abstraction and transfer of the hydrogen atom easier.

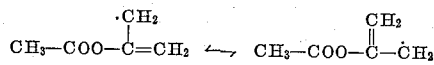

Consequently, the monomer free-radical is less reactive, that is to say, has less of a tendency to initiate a new polymer chain. At the same time, the gain of a hydrogen atom by the growing polymer chain terminates the chain. Such a chain-transfer reaction, therefore, is virtually and essentially a termination reaction and, accordingly, has come to be referred to in the polymer art as "degradative chain-transfer."

In the light of this knowledge, it is believed that prior efforts to produce high-molecular weight isopropenyl acetate homopolymers have heretofore been unrewarded to a large extent due to degradative chain-transfer. It is also believed that degradative chain-transfer is responsible for the large amounts of free-radical polymerization catalyst often required in conventional isopropenyl acetate polymerizations, e.g., amounts of about 2 mole percent or more based upon the monomer since growing polymer chains are thereby terminated after only relatively few monomer units have been added. The isopropenyl acetate homopolymers heretofore obtained by prior art polymerization processes, for example, have ordinarily been relatively low-molecular weight, liquid polymers.

Unexpectedly, it has now been found that isopropenyl acetate can be polymerized via polymerization reactions in which chain-propagation is highly favored over degradative chain-transfer so as to obtain as products solid, high-molecular weight isopropenyl acetate homopolymers. More particularly, the present invention depends upon the finding that solid, high-molecular weight isopropenyl acetate homopolymers can be produced by polymerizing isopropenyl acetate in contact with a catalytic amount of a free-radical polymerization catalyst at high pressures of at least about 20,000 pounds per square inch. The solid isopropenyl acetate homopolymers of this invention thus obtained can, in turn, be employed to produce hard and glossy films, protective coatings, moldings, laminates and the like, such articles being characterized by having both a high degree of light stability in that they undergo very little color change, if any, when exposed to ultraviolet light, and a high degree of thermal stability.

Unlike the low-molecular weight, liquid isopropenyl acetate homopolymers known to the art, the poly(isopropenyl acetate) products produced by the process of this invention are solid, high-molecular weight, hard and glossy, glass-like homopolymers having a relative viscosity of at least 1.01, and generally in the range of from about 1.02 to about 1.1 to 1.2 or slightly higher. The term "relative viscosity" is well known in the polymer art, and designates the value obtained by dividing the viscosity of a solution of the polymer by the viscosity of the pure solvent, as derived, for instance, from the following equation:

Relative viscosity=$C_sT_s/C_0T_0$ wherein $C_s$ is the density of the polymer solution, $C_0$ is the density of the pure solvent, $T_s$ is the efflux time of the polymer solution and $T_0$ is the efflux time of the pure solvent, the efflux time being measured, for example, using an Ubbleohde viscometer. Moreover, in all instances, unless otherwise specifically stated, the relative viscosities described herein and in the appended claims define the values obtained from measurements using, as the polymer solution, a 0.2 percent by weight solution of the polymer in cyclohexanone, and determined at a temperature of 30° C. Thus derived, the relative viscosity of a polymer is regarded as a direct measure of the molecular weight of the polymer, with a higher relative viscosity value indicating a higher molecular weight for the polymer.

In an embodiment of the process of this invention, isopropenyl acetate and a free-radical polymerization catalyst are brought into intimate contact at a pressure and temperature within the ranges herein prescribed. The polymerization catalysts which are suitable for use in the process of this invention are the conventional free-radical catalysts commonly employed in addition polymerization reactions. Thus, the term "free-radical polymerization catalyst" is used herein to refer to compounds which contain —O—O— or —N=N— structural linkages, or are capable of forming these linkages by the action of dilute inorganic acids, or which otherwise produce free-radicals in situ during the polymerization reaction. As suitable catalysts, one can employ, for example, oxygen; hydrogen peroxide; acyl or aroyl peroxides such as benzoyl peroxide, acetyl peroxide, lauroyl peroxide, tertiarybutyl hydroperoxide, ditertiarybutyl peroxide, dibenzoyl peroxide, methyl benzoyl peroxide, acetyl benzoyl peroxide, peracetic acid, etc.; alkali metal persulfates such as sodium- and potassium persulfates, etc.; alkali metal- and ammonium perborates and percarbonates; alkyl percarbonates such as isopropyl percarbonate and butyl percarbonate, etc.; azo compounds such as azobisisobutyronitrile, azobis(dimethylvaleronitrile), dimethyl azobisisobutyrate, azobisisobutyramide, etc.; trialkylborons such as tributylboron and trioctylboron, etc. and the like.

The concentration of the free-radical polymerization catalyst that is employed in the process of this invention can vary broadly in the range of from about 0.01 mole percent to about 1 mole percent of catalyst based upon the isopropenyl acetate monomer, that is to say from about 0.01 mole to about 1 mole of catalyst per 100 moles of monomer, with catalytic amounts below or above this range also being suitable for use. However, little additional advantage, if any, may accrue from the use of catalyst concentrations in excess of this range, while the rate of polymerization may rapidly decrease when lesser catalytic concentrations are employed. The preferred catalyst concentration is from about 0.1 mole percent to about 0.5 mole percent of catalyst based upon the monomer. Such amounts of catalyst, it is to be noted, are generally below those ordinarily employed in conventional isopropenyl acetate polymerizations. This advantage is attributable to the fact that, as hereinabove described, chain-propagation is highly favored over degradative chain-transfer in the process of this invention.

The pressure employed in the polymerization process of this invention is of salient importance thereto, and should be at least about 20,000 pounds per square inch if chain-propagation is to be highly favored over degradative chain-transfer during the reaction, as is required for the production of the solid, high-molecular weight isopropenyl acetate homopolymers of this invention. The maximum pressure which can be employed is restricted solely by the limitations imposed by the equipment utilized. Hence, pressures of from about 20,000 pounds per square inch to about 125,000 pounds per square inch, or higher, can satisfactorily be employed. The preferred pressure range is from about 40,000 pounds per square inch to about 100,000 pounds per square inch.

The polymerization temperature can vary broadly in the range of from about −80° C. to about +100° C., with temperatures of from about −10° C. to about +70° C. being preferred. A balance of pressure and temperature must be achieved to prevent decomposition, as is well known in the art among those skilled in high pressure polymerization reactions, with especially good results being realizable using higher pressures in conjunction with lower temperatures within the aforementioned ranges. As also recognized by those skilled in the art of polymerization reactions, the temperature to be employed may also depend in part upon the particular polymerization catalyst used. Thus, for instance, somewhat lower polymerization temperatures of from about −10° C. to about 30° C. are more preferably employed in conjunction with the use of trialkylboron catalysts as compared with the more preferred use of polymerization temperatures of from about 30° C. to about 70° C. in conjunction with the use of peroxidic catalysts.

The polymerization process of this invention can be carried out continuously in a tubular reactor, semi-continuously or batchwise, with or without a diluent such as toluene, benzene, heptane etc. In any event, vigorous agitation and good cooling should be employed, particularly in bulk- or large-scale operations, to provide for the rapid removal of the heat of polymerization. Upon carrying out the polymerization for a period of time sufficient to produce a solid poly(isopropenyl acetate) product, which period can vary from as little as about 1 hour or less, up to three or more days, if desired, the resulting polymer can be recovered by any convenient means such as by precipitation, filtration, evaporation, etc.

In similar manner, isopropenyl acetate can also be polymerized with minor amounts of other monomers which are copolymerizable therewith, such as vinyl- and allyl-monomers, to form solid, high-molecular weight copolymeric products.

The following examples further serve to define and illustrate the invention, and are not to be construed as limitative thereof. In the examples, the term "glass-transition" temperature, where employed is meant to define the softening point of the polymer, and was determined in the following manner. An Ames dial gauge, with a spring load of about 125 grams, was fitted with an adaptor to allow a 50 mil diameter point to press against a cold 10 to 20 mil thick pressed plaque prepared from the polymer, thus applying a force of about 140 pounds per square inch to the polymer at the point of contact. The polymer was heated so that the temperature increased at a rate of about 2° C. per minute, and the concomitant increase in depth of penetration of the gauge point was recorded. The depth of penetration in 0.01 mm. increments was then plotted graphically against the temperatures at which the values were obtained. The first sharp increase in penetration with increasing temperature, as indicated by an abrupt change in the slope of the graph, is associated with and determinative of the glass-transition temperature or softening point of the polymer.

Example I

A 10-milliliter static tube reactor 8 inches long and having an inner diameter of ⁵⁄₁₆ inch was charged under a nitrogen atmosphere with 0.05 gram of benzoyl peroxide and filled with approximately 10 millimeters of isopropenyl acetate at room temperature. The charge was compressed to 76,800 pounds per square inch and maintained at this pressure by the injection of additional isopropenyl acetate, and at a temperature of between 68° C. and 78° C., for a period of 14 hours. Conducted in this manner, the polymerization reaction produced 1.23 grams of a solid homopolymer of isopropenyl acetate. Physical studies showed the poly(isopropenyl acetate) product to be a glass-like polymer having a relative viscosity of 1.07 and a glass-transition temperature of 45° C.

Example II

To the reactor and in the manner described in Example I, there were charged 0.05 gram of azobisisobutyronitrile and 10 milliliters of isopropenyl acetate at room temperature. The charge was compressed to 79,200 pounds per square inch, and maintained at a pressure of between 74,400 and 79,200 pounds per square inch by the injection of additional isopropenyl acetate, and at a temperature of 60° C., for a period of 14 hours. The polymerization reaction produced 0.237 gram of a solid homopolymer of isopropenyl acetate having a relative viscosity of 1.05.

Example III

To the reactor and in the manner described in Example I, there were charged 0.2 milliliter of a 25 percent by weight solution of acetyl peroxide in dimethyl phthalate, and approximately 10 milliliters of isopropenyl acetate at room temperature. The charge was compressed to 82,200 pounds per square inch and maintained at a pressure of between 48,000 and 82,200 pounds per square inch by the injection of additional isopropenyl acetate, and at a temperature of between 54° C. and 60° C., for a period of 10 hours. The polymerization reaction produced 0.49 gram of a solid homopolymer of isopropenyl acetate having a relative viscosity of 1.04.

Example IV

To the reactor and in the manner described in Example I, there were charged 0.05 gram of isopropyl percarbonate and 10 milliliters of isopropenyl acetate at room temperature. The charge was compressed to 78,000 pounds per square inch and maintained at a pressure of between 72,000 and 78,000 pounds per square inch by the injection of additional isopropenyl acetate, and at a temperature of between 15° C. and 29° C., for a period of 13 hours. The polymerization reaction produced 0.15 gram of a solid homopolymer of isopropenyl acetate having a relative viscosity of 1.02.

Example V

To the reactor and in the manner described in Example I, there were charged 0.2 milliliter of a 50 percent by weight solution of tributylboron in isooctane, and 10 milliliters of isopropenyl acetate, at a temperature of −10° C. The charge was compressed to 51,600 pounds per square inch and maintained at a pressure of between 48,600 and 51,600 pounds per square inch by the injection of additional isopropenyl acetate, and at a temperature of between —77° C. and —73° C., for a period of 14 hours. The polymerization reaction produced 0.289 gram of a solid homopolymer of isopropenyl acetate having a relative viscosity of 1.02.

*Example VI*

To the reactor and in the manner described in Example I, there were charged of 0.05 gram of benzoyl peroxide and 10 milliliters of isopropenyl acetate at room temperature. The charge was compressed to 19,200 pounds per square inch and maintained at a pressure of between 16,000 and 22,800 pounds per square inch by the injection of additional isopropenyl acetate, and at a temperature of between 68° C. and 70° C., for a period of 14 hours. The polymerization reaction produced 0.883 gram of a solid homopolymer of isopropenyl acetate having a relative viscosity of 1.04.

A 0.482 gram sample of the polymer was molded at a temperature of 65° C. and at a pressure of 500 pounds per square inch using a Buehler hydraulic press to produce a hard and glossy plaque having a thickness of about 21 mils. A plaque of this type was found to possess a high degree of light stability when subjected to ultra-violet irradiation.

What is claimed is:

1. Solid homopolymers of isopropenyl acetate having a relative viscosity in the range of from about 1.01 to about 1.2.

2. Solid homopolymers of isopropenyl acetate having a relative viscosity in the range of from about 1.02 to about 1.1.

3. A process for the production of solid, high molecular weight isopropenyl acetate homopolymers which comprises polymerizing isopropenyl acetate with a free-radical polymerization catalyst at high pressures above about 20,000 pounds per square inch.

4. A process for the production of solid homopolymers of isopropenyl acetate which comprises contacting isopropenyl acetate with a catalytic amount of free-radical polymerization catalyst at a pressure of from about 20,000 pounds per square inch to about 125,000 pounds per square inch and at a temperature of from about —80° C. to about +100° C.

5. A process for the production of solid homopolymers of isopropenyl acetate which comprises contacting isopropenyl acetate with a catalytic amount of free-radical polymerization catalyst at a pressure of from about 40,000 pounds per square inch to about 100,000 pounds per square inch and at a temperature of from about —10° C. to about +70° C.

6. The process according to claim 5 wherein the catalyst is isopropyl percarbonate.

7. The process according to claim 5 wherein the catalyst is azobisisobutyronitrile.

8. The process according to claim 5 wherein the catalyst is tributylboron.

9. The process according to claim 5 wherein the catalyst is acetyl peroxide.

10. The process according to claim 5 wherein the catalyst is benzoyl peroxide.

References Cited

UNITED STATES PATENTS

| 1,952,116 | 3/1934 | Bridgman et al. | 260—89.1 |
| 2,751,372 | 6/1956 | Taylor et al. | 260—89.1 |
| 2,816,883 | 12/1957 | Larchar et al. | 260—94.9 |

OTHER REFERENCES

Hart et al.: Journal Polymer Science, vol. 5, pp. 55–57 (1950).

Gaylord: Journal Polymer Science, vol. 5, p. 743 (1950).

Bywater et al.: American Chemical Society Division of Polymer Chemistry Papers presented at Cleveland Meeting, pp. 143–144, April 1960.

JOSEPH L. SCHOFER, *Primary Examiner.*

J. R. LIBERMAN, H. BURSTEIN, H. WONG, JR., J. F. McNALLY, *Assistant Examiners.*